US006816117B2

(12) United States Patent
Fink et al.

(10) Patent No.: US 6,816,117 B2
(45) Date of Patent: Nov. 9, 2004

(54) DISTRIBUTED ANTENNA SYSTEM AND METHOD

(75) Inventors: Patrick W. Fink, Fresno, TX (US); Justin A. Dobbins, Houston, TX (US)

(73) Assignee: The United States of America as represented by the United States National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/867,993

(22) Filed: May 24, 2001

(65) Prior Publication Data

US 2002/0180641 A1 Dec. 5, 2002

(51) Int. Cl.[7] .............................. G01S 3/02
(52) U.S. Cl. ........................................ 342/464
(58) Field of Search ................. 342/357.11, 464

(56) References Cited

U.S. PATENT DOCUMENTS

| | | | |
|---|---|---|---|
| 5,185,610 A | 2/1993 | Ward et al. | 342/357 |
| 5,347,286 A | 9/1994 | Babitch | 342/359 |
| 5,477,458 A | 12/1995 | Loomis | 364/449 |
| 5,587,904 A | 12/1996 | Ben-Yair et al. | 364/449.7 |
| 5,890,091 A | 3/1999 | Talbot et al. | 701/215 |
| 5,943,008 A | 8/1999 | Dusseldorp | 342/357 |
| 6,005,514 A | * 12/1999 | Lightsey | 342/365 |
| 6,018,315 A | 1/2000 | Ince et al. | 342/357.11 |
| 6,052,647 A | 4/2000 | Parkinson et al. | 701/215 |
| 6,061,632 A | 5/2000 | Dreier | 701/215 |
| 6,067,484 A | 5/2000 | Rowson et al. | 701/16 |
| 6,088,653 A | 7/2000 | Sheikh et al. | 701/214 |
| 6,101,430 A | 8/2000 | Fuller et al. | 701/13 |
| 6,128,557 A | * 10/2000 | Fenton et al. | 701/13 |
| 6,188,357 B1 | * 2/2001 | Ray et al. | 342/465 |

OTHER PUBLICATIONS

Taggart, David et al, "The calculation of the Phase Center for Spacecraft Phased Array Antennas," IEEE Military Communications Conference, Nov. 1995, pp. 1046–1050, vol. 3.*

Lightstone, Leonard, "Antenna Distortion in Multiple Phase Centre Interferometric Systems," International Geoscience and Remoe Sensing Symposium, Aug. 1994, pp. 1980–1982, vol. 2.*

Tittensor, P.J. et al, "Calibration of a Multi–Octave Phased Array," International Conference on Antennas and Propagation ICAP'91, Apr. 1991, pp. 790–793, vol. 2.*

Tranquilla, James M. et al, "On the Use of Multiple Antenna Arrays and Corner Reflector Assemblies in Radio Positioning Applications," IEEE Journal of Oceanic Engineering, Jul. 1986, pp. 422–427.*

* cited by examiner

Primary Examiner—Gregory C. Issing
(74) Attorney, Agent, or Firm—James M. Cate

(57) ABSTRACT

System and methods are disclosed for employing one or more radiators having non-unique phase centers mounted to a body with respect to a plurality of transmitters to determine location characteristics of the body such as the position and/or attitude of the body. The one or more radiators may consist of a single, continuous element or of two or more discrete radiation elements whose received signals are combined. In a preferred embodiment, the location characteristics are determined using carrier phase measurements whereby phase center information may be determined or estimated. A distributed antenna having a wide angle view may be mounted to a moveable body in accord with the present invention. The distributed antenna may be utilized for maintaining signal contact with multiple spaced apart transmitters, such as a GPS constellation, as the body rotates without the need for RF switches to thereby provide continuous attitude and position determination of the body.

43 Claims, 4 Drawing Sheets

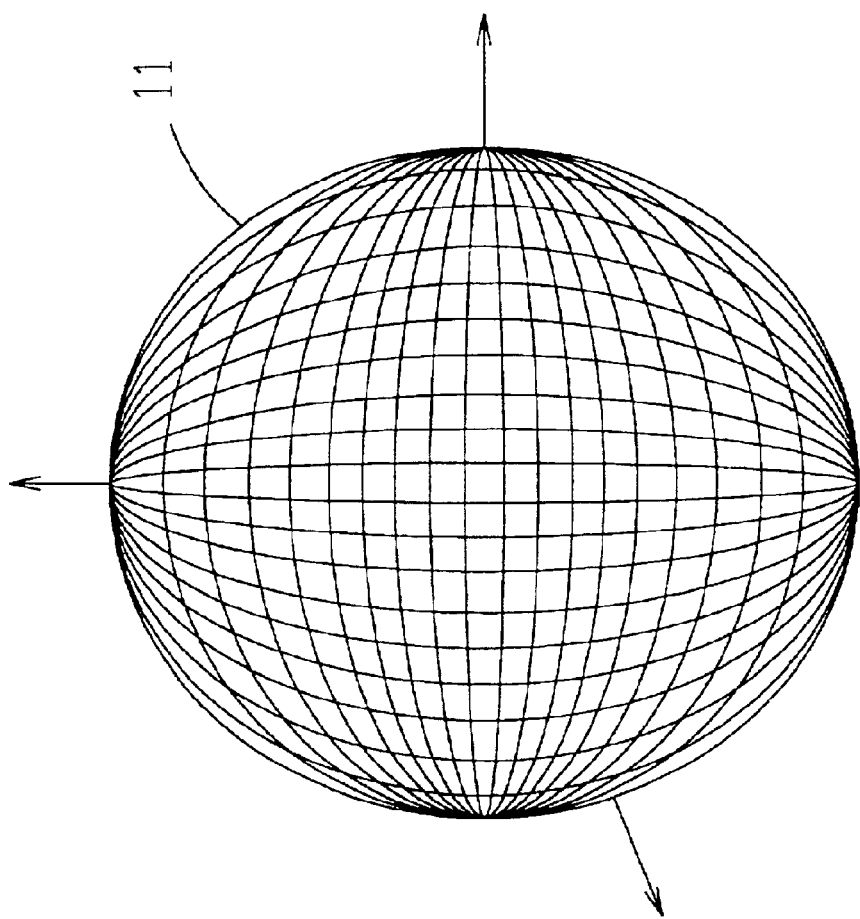

DISTRIBUTED ANTENNA SYSTEM AND METHOD

ORIGIN OF THE INVENTION

The invention described herein was made by employee(s) of the United States government and may be manufactured and used by or for the Government of the United States of America for governmental purpose without payment of any royalties thereon or therefor.

BACKGROUND OF THE INVENTION

1. Field of the Invention

The present invention relates generally to distributed antennas and methods and, more specifically, to a distributed antenna with a non-unique phase center that may, in a preferred embodiment, be used for position and attitude determination.

2. Background of the Invention

It is well known that the global positioning system (GPS) may be used for position and attitude determinations whereby the GPS receivers solve the pseudo-range equations. It is also well known that much more accurate position and attitude determinations, within less than one centimeter, can be made utilizing carrier phase measurements in conjunction with the global positioning system (GPS). However, prior art carrier phase location systems may frequently experience problems due to their antenna systems. For instance, especially on moveable items such as vehicles, planes, satellites, thrusters, cell phones, hand-held GPS detectors, and the like, the coverage of the antenna(s) may be limited. Rotation or movement of the item to which the antenna(s) are secured may result in a loss of signal with respect to one or more GPS satellites. While multiple antennas can be utilized to maintain better contact, the need for RF switches, lengthy "times to fix", and complex switching algorithms, may reduce system reliability and performance while significantly increasing the cost thereof. Moreover, such antenna systems may not be suitably conformable to the surface of the structure upon which they are used so as to be practical, especially for smaller devices such as thrusters, cell phones, satellites, and the like.

While wrap-around antennas, such as spherical and cylindrical antennas, are known to have a wide angle coverage which would theoretically maintain better contact with a plurality of satellites, they also have a non-unique phase center. For instance, if a plurality of satellite signals are received by a wrap-around antenna, there may be a plurality of different phase centers, equal to the number of observed satellites. The position derived using prior art GPS carrier phase techniques requires the position of the antenna phase center. Therefore, the GPS carrier phase solution will be ambiguous when the antenna does not possess a unique phase center. The inventor has determined that it would be desirable to remove the ambiguity resulting from GPS carrier phase measurements obtained with distributed antennas for which the phase center is not unique so as to take advantage of the wide angle of reception afforded by such antennas.

Various inventors have attempted to solve problems as indicated by the following U.S. Patents.

U.S. Pat. No. 5,890,091, issued Mar. 30, 1999, to Talbot et al., discloses a fixed and roving pair of four observable GPS receivers and a communication link between them for double differencing code and carrier measurements. Carrier phase integer ambiguities are resolved efficiently by searching the simultaneous narrow-lane intersections of both the L1 and L2 wave fronts propagated by the GPS satellites being tracked. External constraint information, such as elevation, is additionally used to speed up integer ambiguity resolution. Data between the reference station and the rover is communicated in compressed form at a regular interval, e.g., once a second at each epoch, and demi-measurements of carrier phase are obtained more frequently, e.g., ten times a second, and used to propagate solutions between epochs.

U.S. Pat. No. 5,943,008, issued Aug. 24, 1999, to D. L. Van Dusseldorp, discloses a platform attitude determination made with a single receiver in a global positioning system (GPS). The receiver receives at least three sets of GPS signals from three antennas. Two of the GPS signals are delayed so that the receiver receives each GPS signal in separate time domain slots. In this way, the synchronization of separate GPS receivers does not have to be accomplished.

U.S. Pat. No. 5,347,286, issued Sep. 13, 1994, to D. Babitch, discloses a system for automatically pointing a directional antenna. The system comprises two GPS antennas mounted at horizontally opposed extremities of the directional antenna. The placement is such that the GPS antennas lie on a line having a normal vector approximately parallel to a boresight of the directional antenna. The outputs from the GPS antennas are down converted to a measurement frequency and differentially phase compared for each of a plurality of radio visible GPS satellites. A measurement controller receives the phase comparisons. A navigation computer receives measurements from the measurement controller and uses a microprocessor to calculate the GPS latitude and longitude and the attitude angles of the pair of GPS antennas. A servo points the directional antenna at a particular target communications satellite, based on the computed azimuth, elevation, latitude, and longitude, as provided by the navigation computer. One of these servos is used to move the GPS antennas in roughly a circle to average out multipath effects to improve accuracy and reduce integer ambiguities.

U.S. Pat. No. 5,185,610, issued Feb. 9, 1993, to Ward et al., discloses a GPS single-receiver pointing/attitude system which derives pointing/attitude measurements by correlating a selected GPS code (either P or C/A), recovered from GPS navigation signals using a single GPS receiver with multiple GPS antennas (a reference antenna and at least two slave antennas for pointing or three for attitude). For a two antenna pointing application, with a GPS receiver for each receiver channel, the incoming GPS signals are applied to three code correlators assigned to the reference antenna, and three code correlators assigned to the slave antenna, which provide corresponding reference and slave I and Q correlation outputs. The single-receiver pointing technique involves: (a) using the reference I and Q correlation outputs to establish a conventional reference antenna tracking loop; and (b) processing the reference and slave I and Q correlation outputs (using differential carrier doppler phase or code phase measurements) to determine phase differences from which pointing can be computed.

U.S. Pat. No. 5,477,458, issued Dec. 19, 1995, to P. V. W. Loomis, discloses method and apparatus for providing GPS pseudo range correction information over a selected geographic region S with a diameter of up to 3000 km with an associated inaccuracy no greater than 5 cm. N spaced apart GPS fiducial stations, whose location coordinates are fixed and known with high accuracy, are provided within or adjacent to the region R. Each fiducial station receives GPS signals from at least four common-view GPS satellites, compares these coordinates with its known location coordinates, determines the pseudo range corrections for its GPS-determined location, and transmits these correction signals to a central station located within or adjacent to the region S. The central station retransmits the pseudo range correction signals throughout the region S. A mobile GPS station within or adjacent to the region S has stored within it coordinates of the GPS determined last location of that mobile station and the spatial coordinates of GPS fiducial stations within S that are closest to the last determined location of that mobile station. The mobile station then computes the differential GPS corrections for the GPS-determined present location of that mobile station. Alternatively, the fiducial stations can transmit to the central station unprocessed GPS signals for determination of the pseudo range correction signals at the central station. This approach can be modified if the region S is two-dimensional, where only one coordinate is needed.

U.S. Pat. No. 5,587,904, issued Dec. 24, 1996, to Ben-Yair et al., discloses an air combat monitoring system comprising a plurality of GPS receivers, mountable on a corresponding plurality of aircraft, an avionics monitor for monitoring the avionics system of the plurality of aircraft, a memory for storing information received from the GPS receivers indicating the location of the plurality of aircraft and information received from the avionics monitor in order to provide a reviewable output indication of the performance of the plurality of aircraft and an information disseminator for communicating information among said plurality of aircraft.

U.S. Pat. No. 6,018,315, issued Jan. 25, 2000, to Ince et al., discloses a space vehicle which uses a signal received from a GPS satellite to determine the attitude of a space vehicle. The signal is received through a pair of antennas and converted to sum and difference outputs by a sum and difference circuit. These outputs are then conveyed to down converter/correlators, and then to envelope detectors. The outputs of the envelope detectors are then converted to a digital format by an analog to digital converter. The digitally formatted sum and difference amplitudes are then used by a processor to calculate the required attitude adjustment to the space vehicle.

U.S. Pat. No. 6,052,647, issued Apr. 18, 2000, to Parkinson et al., discloses an automatic control system for land (and possible marine) vehicles based on carrier phase differential GPS (CPGPS). The system relies on CPGPS to determine vehicle position and attitude very precisely (position to within 1 cm and attitude to within 0.1 degree). A system incorporates a technique to calculate and compensate for antenna motion due to vehicle roll and pitch. One aspect of the system utilizes an intelligent vehicle controller that recognizes and adapts to changing conditions, such as vehicle speed, implements towed by the vehicle, soil conditions, and disturbance level. The system provides the capability to control the vehicle on various paths, including straight lines and arbitrary curves. Also described is a technique for initialization and vehicle control using only a single pseudolite.

U.S. Pat. No. 6,061,632, issued May 9, 2000, to S. D. Dreier, discloses a system and method for determining which of a plurality of correction signals is to be used in a position determination system for determining position. An antenna receives broadcasts of correction data on designated frequencies. The received correction data is analyzed to determine the best correction data signal to use to accurately determine position. The correction data from the selected best source of correction data is coupled to a position determination system for accurate determination of position. Thus, the present invention provides a seamless correction system that determines the best source of correction data from available sources and uses the selected correction data to determine location. The seamless correction system updates the source of correction data automatically. Thus, the user does not have to take the time and effort necessary to determine the location, frequency and format of correction signals broadcast in each area and the user does not have to change frequencies or change equipment to obtain accurate position determination.

U.S. Pat. No. 6,067,484, issued May 23, 2000, to Rowson et al., discloses a differential GPS landing system having at least three GPS receivers at known locations in spatial proximity to each other, wherein each GPS receiver independently receives GPS signals from the plurality of GPS satellites and at least three reference stations, wherein each reference station receives a signal from a different two of the at least three GPS receivers and calculates two separate differential corrections for each satellite, wherein each differential correction is independently calculated using the signals received from a different one of the two GPS receivers. The reference stations preferably average the two calculated differential corrections for each satellite to produce an averaged differential correction for each satellite. The system then validates the averaged differential correction for each satellite calculated by each reference station using two integrity monitors, wherein each integrity monitor receives the averaged differential corrections from a different two of the at least three reference stations, and each integrity monitor compares, with respect to each GPS satellite, the averaged differential corrections from the two of the at least three reference stations to produce a validated set of differential corrections, and broadcasts the averaged differential correction for each satellite calculated by one of the three reference stations. The preferred differential GPS landing system further includes a method that utilizes current differential correction error statistics, prior differential correction error statistics and a Bayesian interval estimation bounding process to provide an error bound on the broadcast differential corrections.

U.S. Pat. No. 6,088,653, issued Jul. 11, 2000, to Sheikh et al., discloses A method for use in vehicle attitude determination includes generating GPS attitude solutions for a vehicle using three or more antennas receiving GPS signals from two or more space vehicles. An inertial navigation system is initialized by setting the attitude of the inertial navigation system to a GPS attitude solution generated for the vehicle and/or the attitude of the inertial navigation system is updated using the GPS attitude solutions generated for the vehicle or GPS estimated attitude error generated for the vehicle. A system for use in vehicle navigation is also provided. The system generally includes three or more GPS antenna/receiver sets associated with a vehicle, an inertial measurement unit that provides inertial measurements for the vehicle, a processing unit of the system having the capability for generating GPS attitude computations for the vehicle using the three or more GPS antenna/receiver sets and signals from two or more space vehicles; the GPS attitude computations include at least one of absolute attitudes and estimated attitude errors. The processing unit of the system also includes a filter for generating estimates of attitude for the vehicle using the inertial measurements from the inertial measurement unit and the attitude computations.

U.S. Pat. No. 6,101,430, issue Aug. 8, 2000, to Fuller et al., discloses an improved GPS Attitude Receiver for spacecraft uses concurrent line-bias estimates derived from GPS signals for attitude determination. Attitude determination is obtained from GPS measurements by an interactive solution of the known "Attitude Master Equation", using RF differential phase measurements and calibrated parameters of baseline vectors and line-biases. A "weighted fit error"W, is derived from the sum squared of discrepancies between predicted and actual measurements, weighted by measurement variances. By minimizing W, the line-bias estimations obtained give more current data including thermal effects and eliminate separate ground calibration tests.

The above prior art does not disclose a system that takes advantage of a greatly improved wrap around coverage from one or more distributed antennas with non-unique phase centers. Therefore, those skilled in the art have long sought and will appreciate the present invention that addresses these and other problems.

SUMMARY OF THE INVENTION

An object of the present invention is to provide an improved distributed antenna and method.

Yet another object of the present invention is to provide an antenna system, that may be used with GPS applications or other multi-transmitter systems, which has a wide angle, or even completely spherical, field of view without the introduction of error due to the non-unique phase center such that as a body supporting the antenna system rotates or partially blocks the antenna system field of view with respect to one or more transmitters, contact with all transmitters is continuously maintained.

Another object of the present invention is to provide an antenna system that is conformable to a surface of a body including smaller bodies such as cell phones, small satellites, thrusters, and the like.

One preferred feature of the invention permits continuous operation of a single distributed antenna without switching between antennas.

Another feature of a presently preferred embodiment is a conformable antenna for moveable spherical or cylindrical bodies.

An advantage of the present invention is the possibility of elimination of lengthy time to first fix following antenna switching.

Yet another advantage of the present invention is the ability to reduce or eliminate the integer ambiguity problem associated with GPS attitude determination.

Yet another advantage of the present invention is the possibility of complete attitude solution (three degrees of freedom) with only two antennas, or a partial attitude solution (two degrees of freedom) with a single antenna.

These and other objects, features, and advantages of the present invention will become apparent from the drawings, the descriptions given herein, and the appended claims. It will be understood that above listed objects, features, and advantages of the invention are intended only as an aid in understanding aspects of the invention, are not intended to limit the invention in any way, and do not form a comprehensive list of such objects, features, and advantages.

Therefore, the present invention comprises a method for utilizing a plurality of transmitters to determine one or more location characteristics of a body wherein the plurality of transmitters may produce a plurality of RF carrier signals. The method may comprise one or more steps such as mounting one or more distributed antennas to the body. Each of the one or more distributed antennas may have a non-unique phase center. Other steps may comprise receiving the plurality of RF carrier signals from the plurality of transmitters with the one or more distributed antennas, and determining the one or more location characteristics of the body. In a preferred embodiment, the method further comprises utilizing carrier phase measurements for determining the one or more location characteristics of the body. The one or more location characteristics may comprise a position and/or an attitude of the body. In one embodiment of the invention, each of the one or more distributed antennas has a substantially spherical coverage. The invention may be successfully utilized even when at least a portion of a view of the one or more transmitters by the one or distributed antennas is blocked by the body. In one embodiment, each of the one or more distributed antennas are circularly constructed to thereby have a respective physical origin. The method may further comprise determining values related to a vector from the respective physical origin of the body or antenna to a phase center with respect to each of the plurality of transmitters.

Other steps may comprise determining a distance between each of the plurality of transmitters and each of a plurality of phase centers whereby each phase center corresponds to one of the plurality of transmitters. In one embodiment, the method comprises obtaining a coarse estimate of a position of the body, and utilizing the coarse estimate for determining a unit vector related to a first position vector of a physical center of the distributed antenna with respect to a reference system. Continuing, the method may further comprise utilizing the unit vector so obtained for determining an improved estimate of a position of the body, and utilizing the improved estimate for determining the unit vector more accurately.

The method may also comprise determining information related to a phase center constellation comprised of a plurality of phase centers such that each phase center in the phase center constellation is related to a respective of the plurality of transmitters. In one embodiment, the method comprises determining a plurality of vector magnitudes whereby each vector magnitude is related to a vector from a physical center of the distributed antenna to one of the plurality of phase centers.

In other words, the method may comprise utilizing a plurality of transmitters in a plurality of locations to determine one or more location characteristics of a body including steps such as mounting one or more distributed antennas to the body wherein each of the one or more distributed antennas may have a plurality of phase centers with respect to the plurality of locations of the plurality of transmitters, and determining a plurality of values related to the plurality of phase centers.

Specific embodiments may include determining a vector to a reference center of the body from a fixed coordinate system and/or determining a vector from the reference center to an $i^{th}$ satellite and/or determining a vector from the reference center to a phase center related to the $i^{th}$ satellite. Other steps may include determining an attitude vector for the body and/or determining a unit vector for the body from the reference center with respect to an $i^{th}$ satellite. In one embodiment, a step involves estimating the unit vector by determining a position vector of the body with respect to a coordinate system. If desired, a further step may comprise reducing the error of the estimate of the unit vector by iteration techniques.

In one embodiment, the method comprises steps such as measuring a carrier phase from an $i^{th}$ satellite, and adding a correction to the measured carrier phase. The correction may be determined utilizing a known attitude of the body. In another embodiment, steps may include determining a magnitude of a vector from the reference center to a phase center related to the $i^{th}$ satellite.

The invention may comprise a system for determining location characteristics of a body utilizing a plurality of spaced apart transmitters. In one embodiment, the system may comprise one or more antennas mounted to the body wherein each of the one or more antennas may have a non-unique phase center with respect to the plurality of spaced apart transmitters. The one or more antennas may preferably provide a wide angle coverage for maintaining contact with the one or more spaced apart transmitters. As well, means are provided for determining the location characteristics in response to reception of signals from the spaced apart transmitters by the one or more antennas. The means for determining the location characteristics may comprise carrier phase related equations.

The invention may comprise a radiator system for determining location characteristics of a body utilizing a plurality of spaced apart transmitters wherein the body may have a curved surface. The radiator system may then comprise one or more radiators mounted to the curved surface of the body so as to conform to the curved surface. Each of the one or more radiators may have a non-unique phase center with respect to the plurality of spaced apart transmitters and the one or more antennas providing a wide angle coverage for maintaining contact with the one or more spaced apart transmitters. In one embodiment, the one or more radiators comprise a circular ring. In another embodiment, the one or more radiators comprise a plurality of circular rings.

BRIEF DESCRIPTION OF THE DRAWINGS

FIG. 6 is a schematic view of a spherical antenna pattern of a distributed antenna in accord with the present invention which may be utilized for maintaining signal contact with multiple transmitters as a body rotates without the need for RF switches.

Figure 1:
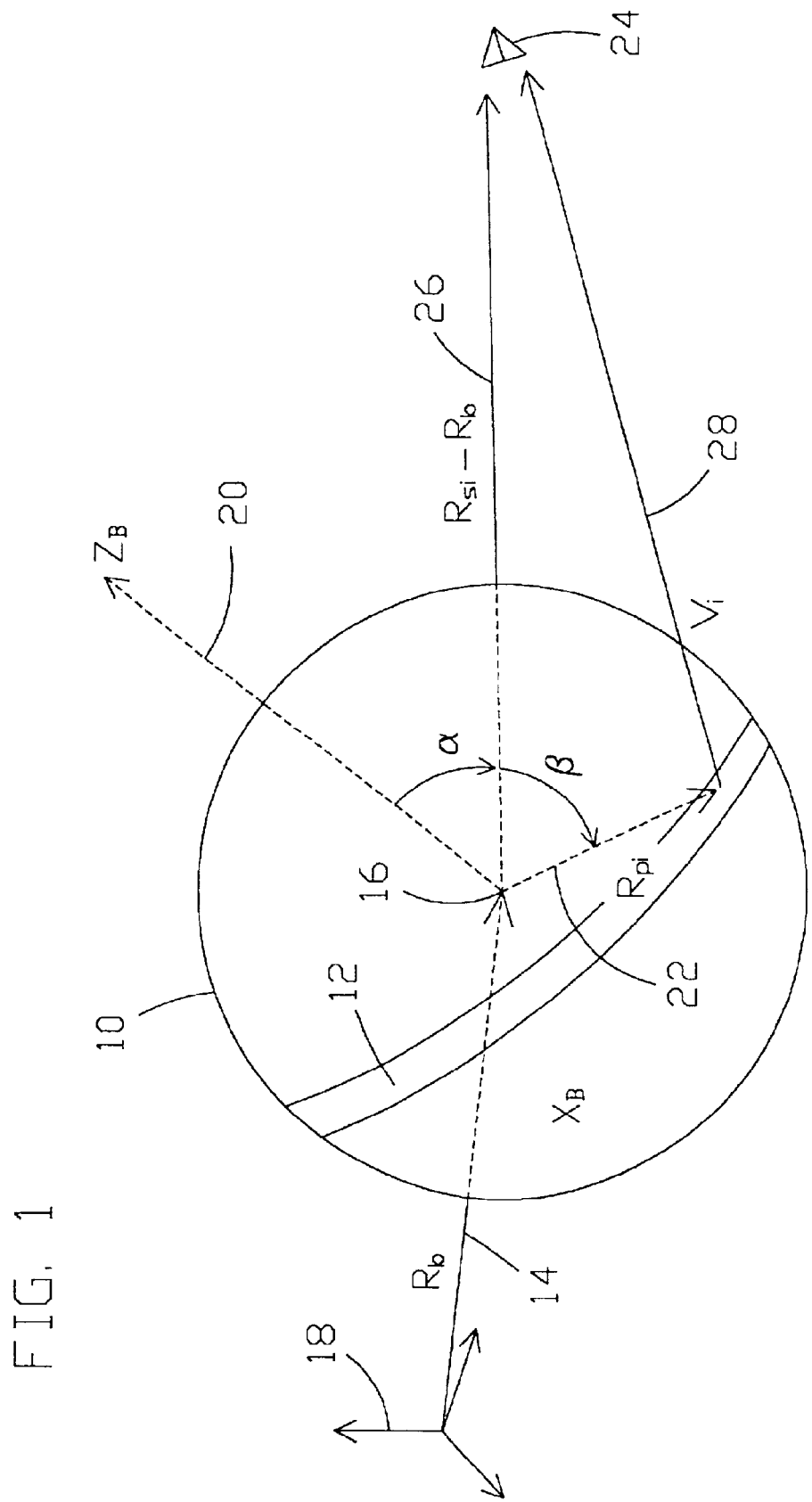
FIG. 1 is a schematic showing a wrap-around antenna on a spherical body in accord with the present invention, an $i^{th}$ satellite, and an associated $i^{th}$ antenna phase center.

While the present invention will be described in connection with presently preferred embodiments, it will be understood that it is not intended to limit the invention to those embodiments. On the contrary, it is intended to cover all alternatives, modifications, and equivalents included within the spirit of the invention and as defined in the appended claims.

DESCRIPTION OF PREFERRED EMBODIMENTS

The present invention provides apparatus and methods for a distributed antenna utilized for the determination of the position and/or attitude of a body when the observable is the phase of the RF carrier signal. In one presently preferred mode of operation, the distributed antenna receives signals from the constellation of the global positioning system (GPS) satellites. However, other transmitters could be used either in conjunction with GPS satellites or instead of GPS satellites. The phrase "distributed antenna" as used herein refers to an electromagnetic wave radiator with a non-unique phase center, i.e., the apparent phase center is dependent upon the relative position of the observer (or GPS satellite). A radiator in accord with the present invention may comprise a single, continuous radiating element or may comprise two or more discrete radiating elements whose received signals are combined.

The antenna of the present invention is preferably designed to provide maximum gain over a desired solid angle in which coverage is required. In one preferred embodiment, nearly complete spherical coverage, i.e., $4\pi$ steradians, is provided to the extent possible without introducing RF switches for antenna selection. For one example of a suitable radiation pattern, FIG. 6 discloses an antenna with spherical radiation pattern 11 in accord with the present invention. It is commonly known that the pattern of the "wrap-around" antenna has nulls (not shown) in the direction of the + and −z-axis (i.e., theta=0 and theta=180 degrees.) The width of the nulls tends to zero degrees as the body diameter increases. Thus, a rotatable body located at the origin of radiation pattern 11 may remain in contact with multiple satellites even as the body is rotated without the need for RF switches.

Antennas commonly used in GPS determination of position and attitude have a unique phase center that is known a priori. The GPS receivers may solve the well-known pseudo range equations (Eqn. 1) for the three unknowns (x, y, and z) that describe the position of the body, as well as the time bias of the user's GPS receiver.

$$\|r_{si}-r_B\|=v_i+ct_b, i=1,2,3,4 \qquad \text{Eqn. 1}$$

where:

$r_{si}$: position of the $i^{th}$ satellite $r_B$: position of the receiver $v_i$: $i^{th}$ pseudo-range measurement c: velocity of light $t_b$: user clock bias The accuracy of the position solution may be enhanced by using GPS carrier phase measurements rather than the pseudo-range measurements. However, the position derived using the GPS carrier phase utilizes the position of the antenna phase center. Therefore, the GPS carrier phase solution will be ambiguous when the antenna does not possess a unique phase center.

One intention of the method described herein is to remove the ambiguity resulting from GPS carrier phase measurements obtained with a distributed antenna for which the phase center is not unique.

Referring now to the drawings, and more particularly to FIG. 1, body 10, whose position/attitude is to be monitored, may for instance be a metallic sphere such as might be used for a satellite. However, other shapes for body 10 could also be used such as cylinders and/or a suitable shaped antenna conformable to the surface of the body whose position/attitude is to be monitored. Again for purposes of explanation, antenna 12 will be assumed a wrap-around or circumferential belt type of antenna as depicted in FIG. 1. It will be understood that wrap-around antenna 12 is intended to be representative of a wide variety of antennas that can be placed in a circular configuration or in a piecewise linear approximation to a circular configuration. The method described herein is applicable even when the body internal to the wrap-around antenna, such as body 10, obscures the view or visibility of part of the antenna, i.e., some part of the antenna or some antennas are not significantly contributing to the composite signal due to blockage of the line of sight by the body. While body 10 is a sphere, the same reasoning would also apply to a cylinder and/or any distributed antenna or distributed antenna system possessing suitable symmetry.

In FIG. 1, position vector 14 to center 16, within fixed coordinate reference system 18, is shown as $r_b$. The z-axis 20 of sphere 10, which is normal to the plane containing wrap-around antenna 12, is denoted by $Z_B$. The position of the $i^{th}$ satellite, noted as satellite 24, with respect to the origin of reference system 18 is vector $r_{si}$ (not shown). Vector 26 is then $r_{si}-r_b$. Vector 22, labeled as vector $r_{pi}$, is the vector from center 16 of sphere 10 to the phase center as seen by the $i^{th}$ satellite, e.g., satellite 24. Due to the symmetry of wrap-around antenna 12, vector 22, i.e., vector $r_{pi}$, lies at the intersection of the plane formed by vectors 20, 26 and the equatorial plane containing wrap-around antenna 12. Although vector 22, i.e., vector $r_{pi}$, is shown in FIG. 1 to have a magnitude equal to the radius of sphere 10, this is not generally the case. However, as shown subsequently, the magnitude of vector 22, i.e., vector $r_{pi}$, can be estimated, and is essentially constant as long as the $i^{th}$ satellite, such as satellite 24, is in the same plane.

When GPS carrier phase measurements are employed, the magnitude of the vector 28 (or the "$\|v_i\| \equiv v_i$" in Eqn. 1) is the observable and can be considered to be the distance from the phase center of wrap-around antenna 12 to the $i^{th}$ satellite, such as satellite 24, as determined by the carrier phase measurement.

In a presently preferred embodiment of the present invention, the following equations (Eqn. 2) are hereby proposed to describe the case when antenna 12 is a wrap-around or distributed antenna.

$$\|v_i\|^2 = \|r_{si}-r_B\|^2 + \|r_{pi}\|^2 - 2r_{pi}\cdot(r_{si}-r_B)$$

or, equivalently, $$\|v_i\|^2 = \|r_{si}-r_B\|^2 + \|r_{pi}\|^2 - 2\|r_{pi}\|\|r_{si}-r_B\| \cos(\beta_i) \qquad \text{Eqn. 2}$$

where $$\cos(\beta_i) = \sin(\alpha_i) = \sqrt{1 - \left[\frac{(r_{si}-r_B)\cdot \hat{z}_B}{\|r_{si}-r_B\|}\right]^2}$$

and $$\hat{z}_B = \sin(\theta_B)[\hat{x}_e \cos(\phi_B) + \hat{y}_e \sin(\phi_B)] + \hat{z}_e \cos(\theta_B)$$

Figure 2:
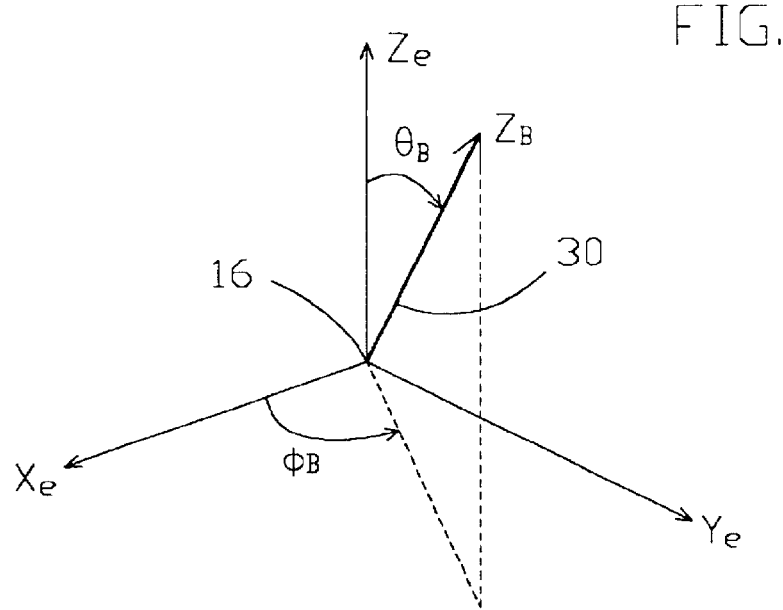
FIG. 2 is a schematic showing an orientation of a body z-axis in fixed coordinates in accord with the present invention.

Eqn. 2 is derived from the "law of cosines" and trigonometric relationships. $\theta_B$ and $\phi_B$ describe the attitude of vector 30 shown in FIG. 2, designated as $z_B$, for sphere 10 of FIG. 1 and FIG. 3. Eqn. 2 is a non-linear set of equations with five unknowns (assuming $\theta_B$ and $\phi_B$ are not already known) or three unknowns (if $\theta_B$ and $\phi_B$ are already known) and a number of equations equal to the number of observed satellites, such as satellite 24. If the user desires position, the primary unknowns are the three vector components of $r_b$. If the clock bias is also corrected, an additional unknown is necessary. It should be noted that the attitude of the body relative to the fixed coordinates might be described in coordinates other than those shown in FIG. 2, i.e., $\theta_B$ and $\phi_B$.

Figure 3:
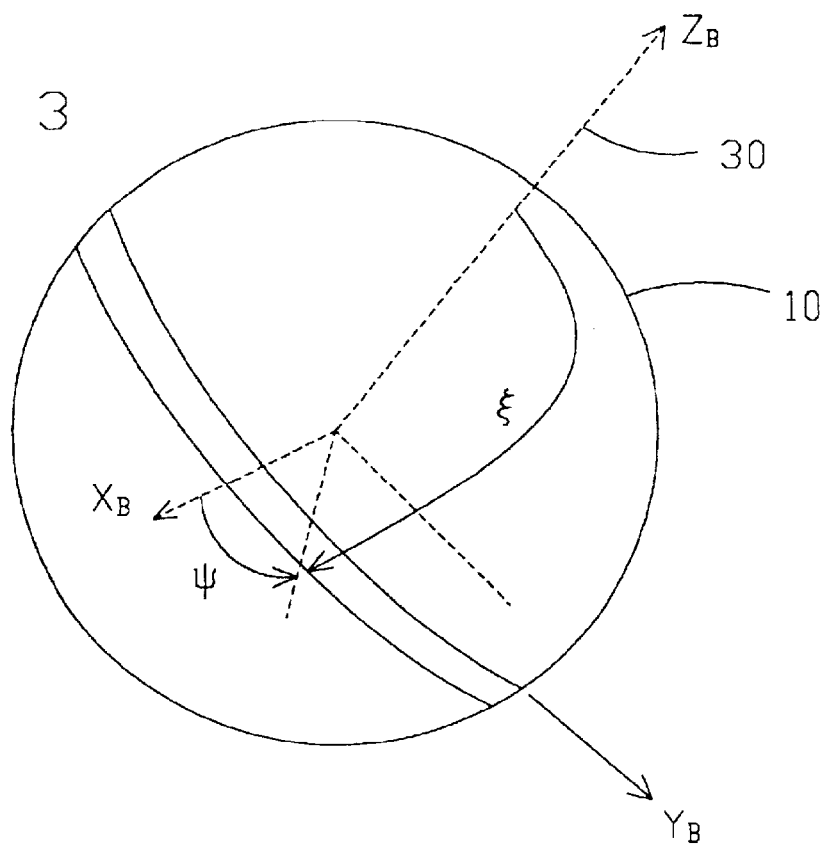
FIG. 3 is a schematic showing local coordinates of the spherical body of FIG. 1 in accord with the present invention.

FIG. 3 shows the local coordinates of sphere 10. Note that the rotation of sphere 10 about the axis $Z_B$, i.e., the location of local body axes $x_B$ and $y_B$, is not required for the solution, nor can it be determined by this method when the antenna has complete azimuthal symmetry. Furthermore, the attitude of vector 30, or $z_B$, is ambiguous in sign when Eqn. 2 is used to determine $\theta_B$ and $\phi_B$. This, however, does not impact the position solution.

As an alternative to the set of equations of Eqn. 2, it may be recognized that the term $\|r_{pi}\|^2$ is much smaller than the remaining $1^{st}$ or $2^{nd}$ equations in Eqn. 2. Recognition of this can be used to simplify the $1^{st}$ equation in Eqn. 2 to the following Eqn. 3.

$$\|v_i\| = \|r_{si}-r_B\| - r_{pi}\cdot \frac{r_{si}-r_B}{\|r_{si}-r_B\|}$$

or, equivalently,
Eqn. 3

$$\|v_i\| = \|r_{si}-r_B\| - \|r_{pi}\|\cos(\beta_i)$$

where $\beta_i$ is defined, as in Eqn. 2,:

$$\cos(\beta_i) = \sin(\alpha_i) = \sqrt{1 - \left[\frac{(r_{si}-r_B)\cdot \hat{z}_B}{\|r_{si}-r_B\|}\right]^2} \qquad \text{Eqn. 4}$$

$$= \sqrt{1 - [\hat{r}_{sib}\cdot \hat{z}_B]^2}$$

where $\hat{r}_{sib} \equiv \frac{(r_{si}-r_B)}{\|r_{si}-r_B\|}$

Note that $\hat{r}_{sib}$ is a unit vector. Furthermore, since $\|r_{si}\| \gg \|r_b\|$ (normally true for GPS), the following approximation of the position vector can be made for the purposes of obtaining the unit vector $\hat{r}_{sib}$:

$$\tilde{r}_b \approx r_b \qquad \text{Eqn. 5}$$

$$\hat{r}_{sib} \approx \frac{r_{si}-\tilde{r}_b}{\|r_{si}-\tilde{r}_b\|}$$

where $\tilde{r}_b$ is a coarse estimate of the body or sphere 10 position. This coarse estimate may come from various sources such as, for instance:

i) A position solution using wrap-around antenna 12 with no phase corrections;

ii) A position solution using wrap-around antenna 12 with the pseudo-range equations; or iii) A previous solution of the carrier-phase range equations with corrections.

The error in $\tilde{r}_{sib}$ should be negligible for most GPS application. However, if desired, the error may be further reduced by iterating. That is, Eqn. 2 or Eqn. 3 can be solved the first time using the approximation of Eqn 5. Then, the first solution, $\tilde{r}_{b1}$, can be used in Eqn. 5 for a revised estimate of $\hat{r}_{sib}$ which can them be used to obtain a second solution, $\tilde{r}_{b2}$, and so forth, to the degree of accuracy necessary.

In another embodiment, the method of the present invention may be applied to the carrier phase range equations to solve for the position of the body when the attitude of the body, such as sphere 10, is known a priori. The adaptation allows the carrier phase range equations to be solved using existing algorithms. The carrier phase measured from each satellite is modified by a correction. The correction is the final term in Eqn. 3. This term may be found using the approximation $\tilde{r}_b$ for $r_b$ as describe above. Since the attitude of the body is known, the body z-axis is known, and the final term in Eqn. 3 can be computed. This term is then added to the measured carrier phase from the $i^{th}$ satellite:

$$\|r_{si}-r_b\|=\|v_i\|+\|r_{pi}\|\cos(\beta_i) \qquad \text{Eqn. 6}$$

The resultant, then represents the carrier-phase from the $i^{th}$ satellite that would be measured at the origin of the body.

The present invention permits determination of the phase center constellation for wrap-around antenna 12. As described above, the vector $r_{pi}$ can be assumed to lie at the intersection of two planes. One plane is the plane spanned by the body z-axis 20, $Z_B$, and the vector to the $i^{th}$ satellite, $r_{si}$. The second plane is the plane containing the wrap-around antenna, such as wrap-around antenna 12. This assumption is base on the symmetry of the radiating structure. It remains only to determine the magnitude of vector 22, $r_{pi}$. If the phase is measured over a plane cut with constant azimuth angle in the local body coordinates, i.e., $\psi$ is constant in FIG. 3 and $\xi$ varies, then the phase at the phase center will lead the phase at the local coordinate origin 16, approximately, by:

$$\Delta=k\|r_{pi}\|\sin(\xi) \qquad \text{Eqn. 7}$$

Figure 4:
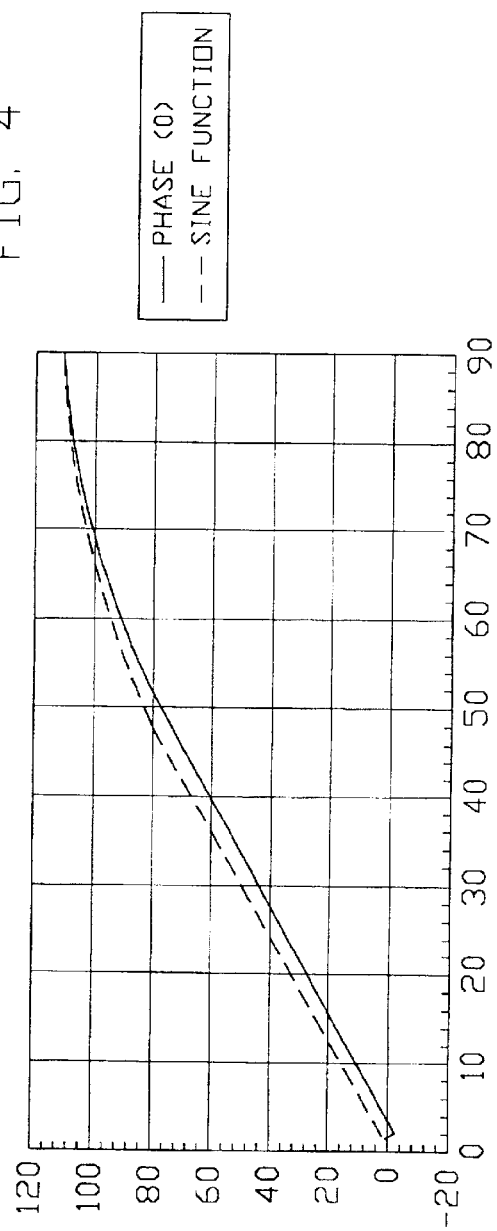
FIG. 4 is a graph showing antenna phase variation over an elevation cut and sine function.
Figure 5:
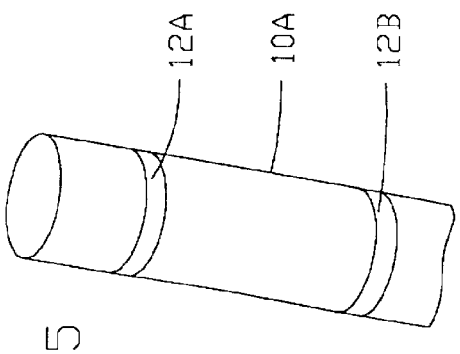
FIG. 5 is a schematic showing two wrap around antennas mounted on a cylindrical structure in accord with the present invention.

Therefore, by measuring the phase of the wrap-around antenna versus $\xi$, with $\psi$ constant, the magnitude of the vector $r_{pi}$ can be determined by a standard least-squares or other appropriate fitting technique applied to Eqn. 8:

$$\Delta_j=\alpha_0+k\|r_{pi}\|\sin(\xi), j=1,\ldots,N \qquad \text{Eqn. 8}$$

where $\alpha_0$ is an additive constant, and the index j ranges over the N sample points. A multitude of cuts, each at different angles, $\psi$, and each corresponding to a different value for the index i, can be used to determine an average value for the magnitude of the vector 22, $r_{pi}$. FIG. 4 shows the simulated phase variation as the angle $\xi$ is varied between 0° and 90° as well as a function given by the right hand side of Eqn. 3 with $\|r_{pi}\|$ chose to satisfy Eqn. 3 exactly at $\xi=90°$.

Therefore, the foregoing disclosure and description of the invention are illustrative and explanatory thereof, and various changes in the method steps and also the details of the apparatus may be made within the scope of the appended claims without departing from the spirit of the invention.

What is claimed is:

1. A method for utilizing a plurality of transmitters to determine one or more location characteristics of a body, said plurality of transmitters producing a plurality of RF carrier signals, said method comprising:

mounting one or more distributed antennas to said body, each of said one or more distributed antennas being comprised of at least one antenna element, at least one of said one or more distributed antennas having a plurality of phase centers such that said plurality of phase centers is equal in number to said plurality of transmitters from which said RF carrier signals are received, each phase center being associated with a respective one of said plurality of transmitters from which said respective RF carrier signals are received, a location of each of said plurality of phase centers being variable with respect to said at least one antenna element in response to a change of a relative orientation between said one or more distributed antennas and said plurality of transmitters;

receiving said plurality of RF carrier signals from said plurality of transmitters with said one or more distributed antennas; and determining said one or more location characteristics of said body.

2. The method of claim 1, wherein said at least one antenna of said distributed antennas comprises a single continuous antenna radiator and said method further comprises simultaneously receiving all of said plurality of RF carrier signals from said single continuous antenna radiator.

3. The method of claim 1, wherein said one or more location characteristics comprises a position of said body.

4. The method of claim 1, wherein said one or more location characteristics comprises an attitude of said body.

5. The method of claim 1, wherein each of said one or more distributed antennas has a substantially spherical coverage.

6. The method of claim 1, wherein at least a portion of a view of said one or more transmitters by said one or more distributed antennas is blocked by said body.

7. The method of claim 6, further comprising providing that each of said one or more distributed antennas are circularly constructed with a respective physical origin.

8. The method of claim 7, further comprising determining a vector from said respective physical origin to each said phase center associated with each of said respective one of said plurality of transmitters.

9. The method of claim 1, further comprising determining a distance between each respective one of said plurality of transmitters and each phase center associated therewith.

10. The method of claim 1, further comprising obtaining a coarse estimate of a position of said body, and utilizing said coarse estimate for determining a unit vector related to a first position vector of a physical center of said distributed antenna with respect to a reference system and a second position vector between said body and a respective of said plurality of satellites.

11. The method of claim 10, further comprising utilizing said unit vector for obtaining an improved estimate of a position of said body, and utilizing said improved estimate for iteratively determining said unit vector more accurately.

12. The method of claim 1, further comprising determining information related to a phase center constellation comprised of said plurality of phase centers.

13. The method of claim 12, further comprising determining a plurality of vector magnitudes whereby each vector magnitude is related to a vector from a physical center of said distributed antenna to one of said plurality of phase centers.

14. A method for utilizing a plurality of transmitters in a plurality of locations to determine one or more location characteristics of a body, said method comprising:

mounting one or more distributed antennas to said body, at least one of said one or more distributed antennas having a plurality of phase centers with respect to said plurality of locations of said plurality of transmitters, said plurality of phase centers being always equal in number to said plurality of transmitters from which respective transmitter signals are received from said plurality of transmitters by said at least one of said one or more distributed antennas, each of said plurality of phase centers being associated with a respective one of said plurality of transmitters from which said respective transmitter signals are received; and determining one or more values related to said plurality of phase centers.

15. The method of claim 14, further comprising:

determining one or more values related to a vector to a reference center of said body with respect to a fixed coordinate system.

16. The method of claim 15, further comprising:
determining one or more values related to a position vector from said reference center to an $i^{th}$ satellite.

17. The method of claim 16, further comprising:
determining one or more values related to a vector from said reference center to a phase center related to said $i^{th}$ satellite.

18. The method of claim 17, further comprising:
determining an attitude vector for said body.

19. The method of claim 16, further comprising:
determining a unit vector for said body from said reference center with respect to an $i^{th}$ satellite.

20. The method of claim 16, further comprising:
estimating a unit vector by obtaining an estimate of said position vector.

21. The method of claim 20, further comprising:
reducing the error of said estimate of said unit vector by iteration.

22. The method of claim 14, further comprising:
measuring a carrier phase from $i^{th}$ satellite, and adding a correction to said measured carrier phase.

23. The method of claim 22, wherein said correction is determined utilizing a known attitude of said body.

24. The method of claim 22, wherein said correction is determined by making an approximation of said position vector.

25. A system for determining location characteristics of a body utilizing a plurality of spaced apart transmitters, said system comprising:
one or more antennas mounted to said body, each of said one or more antennas comprising at least one antenna element, at least one of said one or more antennas having a plurality of phase centers such that a location of each of said phase centers moves with respect to said at least one antenna element with variation of a relative orientation between said one or more antennas and said plurality of spaced apart transmitters; and
means for determining said location characteristics in response to reception of signals from said spaced apart transmitters by said one or more antennas.

26. The system of claim 25, wherein said means for determining said location characteristics comprises utilizing one or more equations related to calculating a carrier phase.

27. The system of claim 25, wherein said means for determining said location characteristics utilizes the following equation:

$$\|v_i\|^2 = \|r_{si} - r_B\|^2 + \|r_{pi}\|^2 - 2\|r_{pi}\|\|r_{si} - r_B\|\cos(\beta_i)$$

where $$\cos(\beta_i) = \sin(\alpha_i) = \sqrt{1 - \frac{(r_{si} - r_B) \cdot \hat{z}_B}{\|r_{si} - r_B\|}}$$

and $$\hat{z}_B = \sin(\theta_B)[\hat{x}_e\cos(\phi_B) + \hat{y}_e\sin(\phi_B)] + \hat{z}_e\cos(\theta_B).$$

28. The system of claim 25, wherein said means for determining said location characteristics utilizes the following equation.

$$\|v_i\| = \|r_{si} - r_B\| - r_{pi} \cdot \frac{r_{si} - r_B}{\|r_{si} - r_B\|}$$

29. The system of claim 25, wherein said means for determining said location characteristics utilizes the following equation.

$$\|v_i\| = \|r_{si} - r_B\| - \|r_{pi}\|\cos(\beta_i)$$

30. The system of claim 25, wherein said means for determining said location characteristics utilizes the following equation.

$$\tilde{r}_{sib} \approx \frac{r_{si} - \tilde{r}_b}{\|r_{si} - \tilde{r}_b\|}$$

31. The system of claim 25, wherein said means for determining said location characteristics utilizes the following equation.

$$\Delta = k\|r_{pi}\|\sin(\xi)$$

32. The system of claim 25, wherein said means for determining said location characteristics utilizes the following equation.

$$\Delta_j = \alpha_0 k\|r_{pi}\|\sin(\xi), j=1, \ldots, N$$

33. A radiator system for determining location characteristics of a body utilizing a plurality of spaced apart transmitters, said body comprising a surface defining a periphery of said body, said periphery extending around said body, said radiator system comprising:
a continuous wrap-around antenna element mounted with respect to said periphery of said body, said continuous wrap-around antenna element having a plurality of phase centers such that said plurality of phase centers is equal in number to said plurality of spaced apart transmitters from which respective transmitter signals are received from said plurality of transmitters by said continuous wrap-around antenna element, each of said plurality of phase centers being associated with a respective one of said plurality of transmitters from which said respective transmitter signals are received.

34. The radiator system of claim 33, wherein said continuous wrap-around antenna element comprises a first circular ring.

35. The radiator system of claim 34, further comprising a second circular ring.

36. The radiator system of claim 33, wherein said continuous wrap-around antenna element extends more than 180° around said periphery of said body.

37. The radiator system of claim 33, wherein said continuous wrap-around antenna element is operable for maintaining continuous contact with said plurality of spaced apart transmitters as said body rotates even when said body obscures a view of said one or more spaced apart transmitters from a portion of said continuous wrap around antenna element.

38. The radiator system of claim 33, further comprising means for determining an attitude of said body utilizing no more than two of said continuous wrap-around antenna elements wherein said body has three degrees of freedom.

39. The radiator system of claim 33, further comprising means for determining an attitude of said body utilizing no more than said continuous wrap-around antenna element wherein said body has two degrees of freedom.

40. A method for carrier phase determination of location characteristics utilizing a plurality of spaced apart transmitters, comprising:

mounting one or more antennas to a moveable body positioned among said plurality of spaced apart transmitters such that said one or more antennas maintain contact with each of said plurality of spaced apart transmitters as said attitude of said body changes without utilizing RF switches, each of said one or more antennas being comprised of at least one antenna element, at least one of said one or more antennas having a plurality of phase centers, a location of said plurality of phase centers being moveable with respect to said at least one antenna element in response to a variation of a relative orientation between said one or more antennas and said plurality of transmitters; and determining one or more values related to one or more of said plurality of phase centers of said one or more antennas.

41. The method of claim 40, further comprising determining an attitude solution for said body when said body has three degrees of freedom utilizing no more than two antennas.

42. The method of claim 40, further comprising determining an attitude solution for said body when said body has two degrees of freedom utilizing no more than one antenna.

43. The method of claim 40, further comprising providing that said one or more antennas has wide angle coverage for simultaneous contact with said plurality of spaced apart transmitters.

* * * * *